United States Patent Office

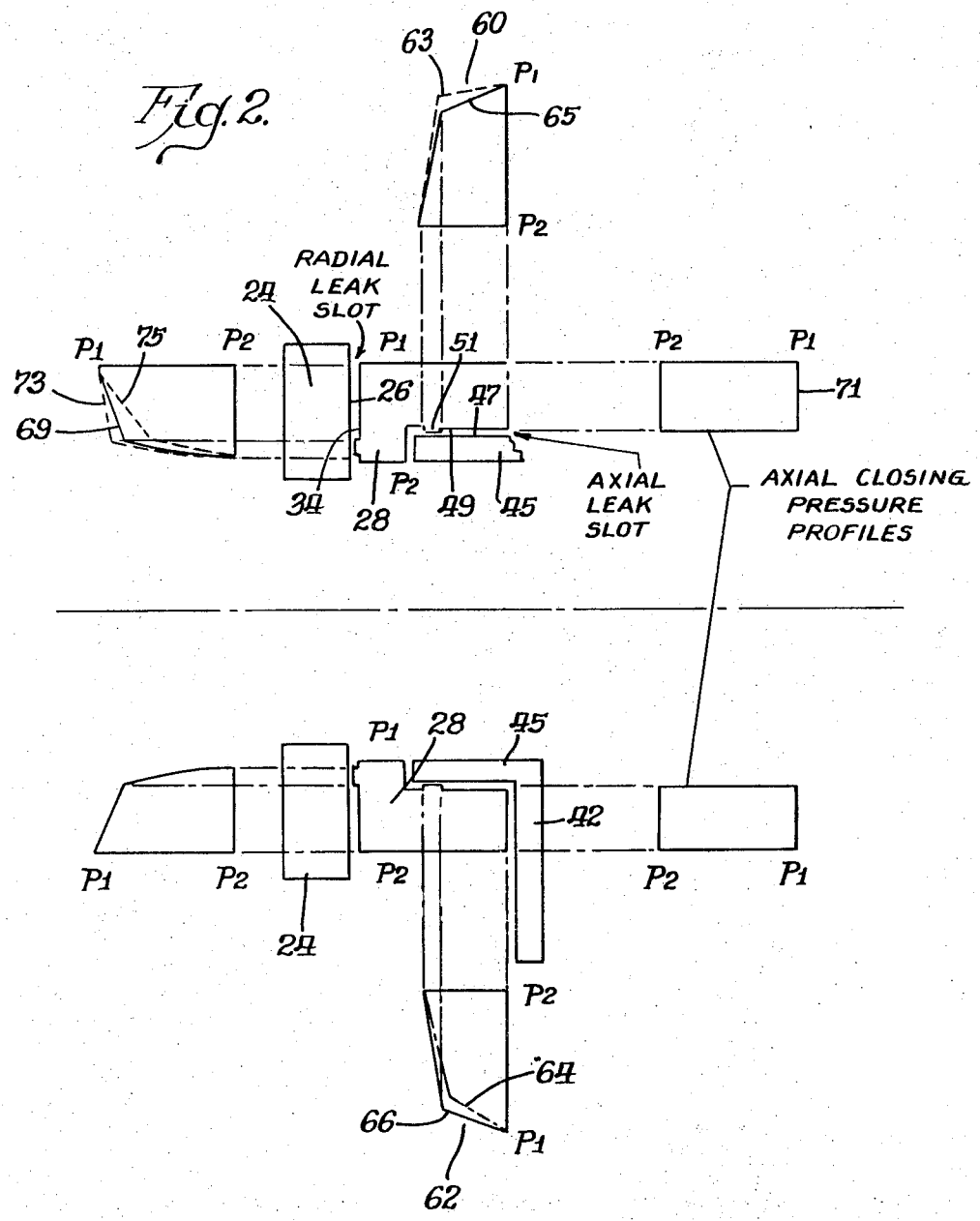

3,606,350
Patented Sept. 20, 1971

3,606,350
HYDROSTATIC SHAFT SEAL
Homer E. Gravelle, Denver, Colo., assignor to
Sundstrand Corporation
Filed July 2, 1969, Ser. No. 838,496
Int. Cl. F16j 15/34
U.S. Cl. 277—27                      6 Claims

ABSTRACT OF THE DISCLOSURE

A hydrostatic shaft seal including an annular sealing ring rotatable with the shaft having a radial sealing surface adjacent to a stepped hydrostatic sealing surface on a floating freely rotatable nosepiece that is centered radially on a stationary centerpost located therewithin by an additional hydrostatic sealing fluid film.

BACKGROUND OF THE PRESENT INVENTION

Hydrostatic seols conventionally operate by controlling leakage between relatively stationary and rotatable sealing members by providing a hydrostatic film between the members which acts as a finite leakage seal. These seals normolly include a telescopic secondary seal member and some mechanism for preventing rotation of one element of the seal. Because of these two features, primarily, prior hydrostatic seals have shown only marginal endurance under severe service. Moreover, the magnitude of the secondary seal friction is frequently high enough to exceed the primary face hydrostotic force and this leads either to massive seal failure or extremely high leakage flow.

The primary object of the present invention is to provide a hydrostatic seal to replace the telescoping secondary seal, as employed in these prior arts constructions, and thereby increase the endurance of all the seal components to practically unlimited life.

SUMMARY OF THE PRESENT INVENTION

In accordance with the present invention a hydrostatic seal is provided in which the normally non-rotatable esaling element is free to rotate and is hydrostatically supported on a centerpost and this reduces oxial friction to essentially zero.

Through the employment of a fluid pressure force opposing the hydrostatic seal separating force acting on the floating seal member, the use of conventional springs for surging the seal members together is eliminated. This floating sealing member is referred to herein as the nosepiece and this pressure differential acting across the nosepiece is sufficient to cause the seal to close to its normal operating position should the seal happen to be open at first exposure to the pressure differential. A baffle between the forward portion and rear portions of the nosepiece effect a pressure drop which produces this pressure differential. Thus, in the present design two hydrostatic clearances and sealing surfaces are employed and while this increases total leakage flow, in many applications this is not significant since the leakage flow is returned to a suitable low pressure point in the system. The added pumping power loss associated with this increased leakage flow will tend to be offset by the lower viscous friction loss due to the lower relative velocity between the rotating sealing ring and the freely rotatable, but somewhat slower, nosepiece.

An additional advantage in the present design because of the springless construction thereof is that in the event of a loss in sealing differential pressure acting on the nosepiece, damage to the seal will not occur since the unloaded nosepiece will simply move to an open position away from the rotating sealing ring.

BRIEF DESCRIPTION OF THE DRAWINGS

FIG. 2 is a diagrammatic view of the present hydrostatic seal assembly with pressure profiles of the hydrostatic sealing surfaces at both top and bottom thereof.

DETAILED DESCRIPTION OF THE PREFERRED EMBODIMENT

Figure 1:
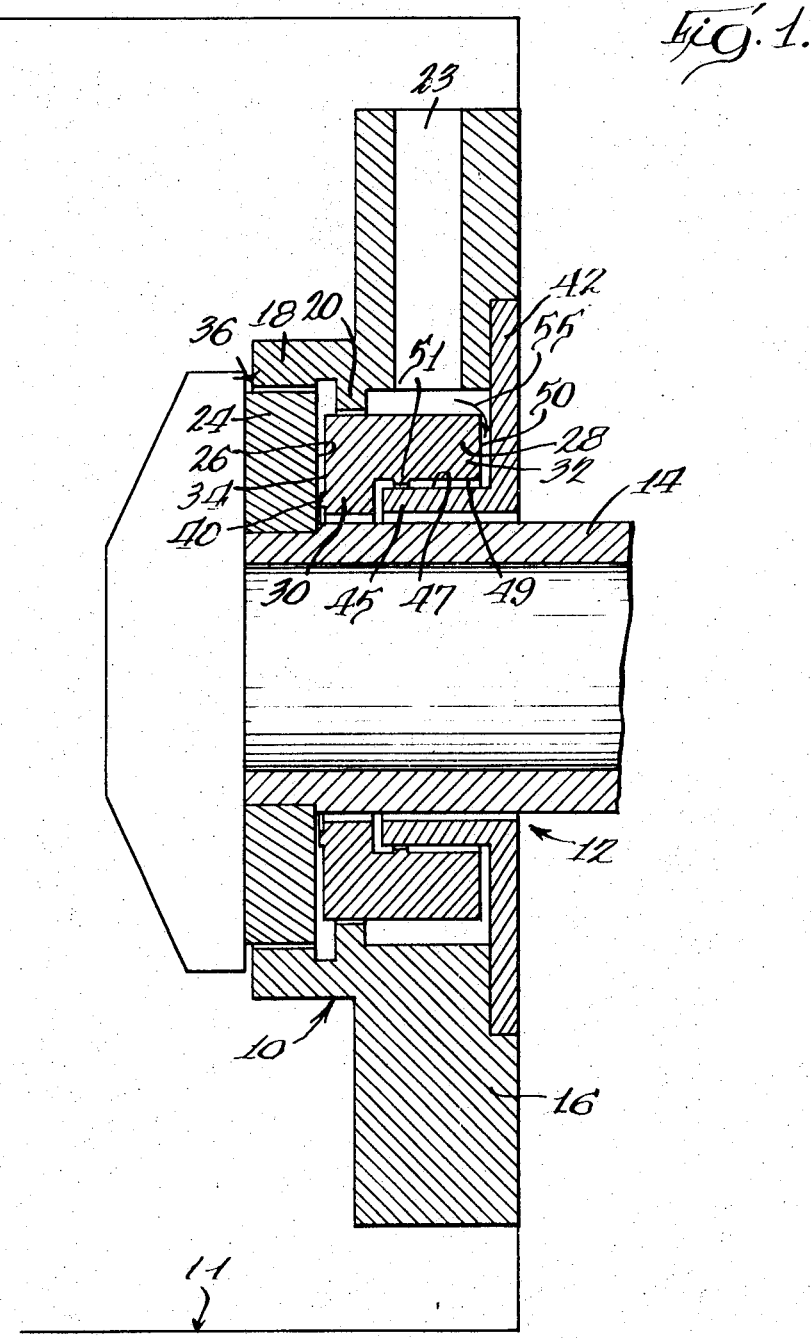
FIG. 1 is a cross section of the present hydrostatic seal assembly.

Referring to the drawings and particularly FIG. 1 a hydrostatic shaft seal assembly 10 is provided according to the principles of the present invention for the purpose of sealing the interior of a housing, such as indicated diagrammatically at 11, from the opening thereof with the low pressure area outside the housing indicated generally at 12.

Shaft seal assembly 10 is illustrated as minimizing leakage along a rotating shaft 14, extending through a housing end plate 16. The housing end plate 16 has an annular projection 18 extending from one end thereof and an inwardly extending annular projection 20 which defines a baffle for a purpose described in more detail hereinafter. An opening 23 is provided in the end plate 16, communicating with the interior of housing 11 and defiining an inlet pasasge for hydraulic fluid to the axial extending portion 32 of nosepiece 28.

The shaft seal assembly 10 includes an annular mating ring 24 rotatably and axially fixed with respect to shaft 14. Mating ring 24 has a flat radially extending surface 26 which defines one of the primary hydrostatic seal faces for the shaft seal assembly 10.

Disposed adjacent the mating ring 24 is an annular nosepiece 28 having a radially extending annular portion 30 and an axially extending annular portion 32.

The nosepiece 28 is free to rotate within the housing plate 16 but is not positively driven by any element in the shaft seal or the shaft itself. The radially inwardly extending portion 30 of the nosepiece has an annular step land 40 which along with surface 34 cooperates with surface 26 to provide the primary seal when supplied with fluid from either the primary inlet 36 between the periphery of mating ring 24 and the annular projection 18 of plate 16, or with fluid from opening 23 flowing past baffle projection 20.

Face 34 and step land 40 provide conventional hydrostatic seal surface geometry. The fluid supplied to the surfaces 26, 34 and 40 provides a hydrostatic film between these surfaces defining the primary seal for the assembly.

For the purpose of radially supporting the nosepiece 28 a stationary centerpost 42 is provided fixed to the end plate 16 by suitable fasteners (not shown). Centerpost 42 has an axially extending sleeve portion 45 between shaft 14 and the axially extending portion 32 of the nosepiece 28. A cylindrical hydrostatic sealing surface 47 is provided on the centerpost and a cooperating generally cylindrical hydrostatic sealing surface 49 is provided on the inner periphery of the axially extending portion 32 of the nosepiece. Surface 49 is stepped as shown at 51 to provide proper hydrostatic seal surface geometry. Fluid from the inlet 23 flows rearwardly around the nosepiece as shown by arrow 55 to the cooperating sealing surfaces 47, 49 and 51 to provide a cylindrical hydrostatic film between these surfaces which acts as a seal as well as providing a centering force for the nosepiece 28 on the centerpost 42.

As shown in FIG. 2 pressure profiles 60 and 62 illustrate the pressures at the hydrostatic sealing surfaces 47, 49 and 51. The dotted profiles 63 and 64 indicate pressure across the hydrostatic, secondary sealing surfaces when the nosepiece 28 is downwardly displaced from its center position on centerpost 42, while the solid line profiles 65 and 66 represent the equilibrium pressure distribution across the secondary sealing surfaces when the nosepiece 28 is properly centered on the centerpost. It should be understood that profiles 63 and 65 occur at the top of the seal and the profiles 64 and 66 occur at the bottom. When the nosepiece is downwardly displaced from its central or equilibrium position, it is apparent that the pressure drop across the recessed portion of the seal as shown by curve 63 is less rapid than the equilibrium pressure 65. The pressure drop across the upper portion occurs because of a pinching off of the hydraulic fluid across the stepped portion 51 at the top of the seal. At the same time, the average pressure at the secondary sealing surfaces at the bottom of the seal, represented by curve 64, drops, so that there is a net strong upward force on the nosepiece 28 resulting therefrom that urges the nosepiece back to its equilibrium position. When the nosepiece is centered the pressure curves 65 and 66 are identical as are all the other pressure profiles around the secondary seal and this maintains the nosepiece 28 in its central position.

As described above the nosepiece 28 is free to rotate and in fact it does rotate at a speed intermediate the speed of mating ring 24 and the centerpost 42 which in the present case is stationary. This rotation is caused by the hydrodynamic viscous drag forces of the fluid superimposed on the hydrostatic film between surfaces 26, 34 and 40 produced by the rotation of the mating ring 24. At start up it is apparent that the nosepiece may be displaced rightwardly from its position shown in FIG. 1. To provide a closing force on the nosepiece 28 so that it assumes its normal operating position shown in FIG. 1 the baffle 20 provides a pressure drop in the fluid flowing from inlet 23 that is sufficient so that the hydraulic force acting on the right surface 50 of the nosepiece is just balanced by the desired hydrostatic film force between surfaces 26, 34 and 40. The equilibrium hydrostatic force is represented by the pressure profile 69 in FIG. 2 while the pressure profile 71 represents the closing hydraulic force on the nosepiece 28. Curve 73 represents the pressure across the primary hydrostatic sealing surfaces when the nosepiece 28 comes too close to mating ring 24. Since a higher average hydrostatic pressure results across the primary surfaces this tends to separate the nosepiece 28 and the mating ring 24 so that the nosepiece assumes again its normal operating position.

Conversely, if the nosepiece 28 is axially separated too far from the mating ring 24 a pressure profile such as shown at 75 will result and the reduced hydrostatic force on the nosepiece 28 will not balance the force provided by the pressure acting on the right side of the nosepiece and it will return to its normal equilibrium position.

Since physical contact between the nosepiece and the centerpost 42 is eliminated, axial friction at the centerpost sleeve 45 is far lower than in prior constructions. An additional operational advantage in the present device is that if for some reason hydrostatic pressure vanishes i.e., no pressure differential across the seal assembly 10, the continued rotation of shaft 14 will not result in damage to the seal since the nosepiece 28 will merely move to its open position. In contrast to this in prior designs where springs are employed, a closing force on the nosepiece 28 would produce contact between the sealing members and damage thereto.

If desired, a filter may be provided for shaft seal fluid to minimize clogging.

I claim:
1. A hydrostatic seal for a rotating shaft, comprising: an annular seal ring rotatably fixed to said shaft and having a generally radially extending sealing surface, an annular seal member surrounding said shaft and having a sealing surface closely adjacent the ring sealing surface, means for supplying fluid between said surfaces to define a hydrostatic seal film, a generally annular stationary member adjacent said annular seal member, said seal member being free to rotate relative to the stationary member under the viscous drag forces produced by said rotating ring, and seal means between said annular members permitting free rotation therebetween.

2. A hydrostatic seal for a rotating shaft as defined in claim 1, wherein said seal means between said members includes generally cylindrical hydrostatic seal surfaces on each of said members.

3. A hydrostatic seal for a rotating shaft as defined in claim 1, including springless means for biasing said annular member toward said annular ring.

4. A hydrostatic seal for a rotating shaft as defined in claim 3, wherein said means for biasing said annular member toward said annular ring includes means for restricting the flow of hydraulic fluid between opposite sides of said annular seal member to provide a fluid pressure drop thereacross tending to urge said annular seal member toward said annular ring.

5. A hydrostatic seal assembly, comprising: a rotatable shaft, an annular seal ring surrounding said shaft and fixed with respect thereto, said annular ring having a generally radially extending sealing surface, a freely rotatable annular nosepiece surrounding said shaft and having a stepped hydrostatic sealing surface adjacent said ring sealing surface, said nosepiece having an annular radially extending portion adjacent said sealing surface and an annular axial portion extending rearwardly from said radially extending portion, means for supplying fluid to said sealing surfaces from a point radially outwardly thereof, a stationary sleeve around said shaft and extending within said axially extending portion of the nosepiece, a stepped hydrostatic seal surface on one of said nosepieces and said sleeve and a cylindrical seal surface on the other, means for supplying fluid to said seal surfaces to hydrostatically support said nosepiece on said sleeve.

6. A hydrostatic seal assembly as defined in claim 5, including a fluid supply passage extending from one side of said nosepiece to the other, and a restriction in said passage for providing a fluid pressure differential across said nosepiece urging the same toward said annular ring.

References Cited
UNITED STATES PATENTS

| 2,221,225 | 11/1940 | Weis et al. | 277—27 |
| 2,814,512 | 11/1957 | Quinn et al. | 277—27X |
| 2,984,507 | 5/1961 | Welch | 277—27 |

FOREIGN PATENTS

| 1,094,058 | 12/1967 | Great Britain | 277—27 |

SAMUEL B. ROTHBERG, Primary Examiner

U.S. Cl. X.R.

277—74